United States Patent Office 3,132,169
Patented May 5, 1964

3,132,169
HALOGENATED PHOSPHORUS ESTERS, AND PROCESS FOR PREPARING THEM
Gail H. Birum, James L. Schwendeman, and Richard M. Anderson, Dayton, Ohio, assignors to Monsanto Chemical Company, St. Louis, Mo., a corporation of Delaware
No Drawing. Filed Sept. 26, 1960, Ser. No. 58,192
12 Claims. (Cl. 260—461)

The present invention provides new and valuable organic compounds of phosphorus, the method of producing the same, and synthetic resinous compositions comprising the new compounds as modifiers therefor.

According to the invention there are provided certain esters of pentavalent phosphorus acids, which esters contain both chlorine and bromine, and which are selected from the class consisting of (I) phosphorobromidochloridates of the formula

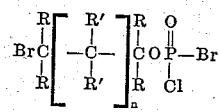

in which R is selected from the class consisting of hydrogen and alkyl and haloalkyl radicals of from 1 to 2 carbon atoms, R' is selected from the class consisting of hydrogen and alkyl and haloalkyl radicals of from 1 to 5 carbon atoms and $n$ is zero or one, and (II) a phosphate of the formula

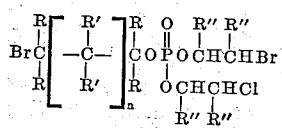

wherein R, R' and $n$ are as above defined and R'' is selected from the class consisting of R' and hydrocarbyloxymethyl radicals of from 1 to 8 carbon atoms, and wherein one R'' at a pair of adjacent carbon atoms must be hydrogen.

The starting material which is employed for preparing the above-defined phosphorobromidochloridates and phosphates is a 2-chloro-1,3,2-dioxaphospholane compound or a 2-chloro-1,3,2-dioxaphosphorinane compound of the structure

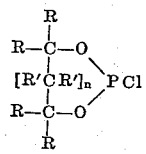

wherein R, R' and $n$ are as defined above. Compounds of this formula are readily obtained, in known manner, by reaction of phosphorus trichloride with a 1,2- or 1,3-alkanediol or a halogen-substitution product thereof.

For preparing the presently provided phosphorobromidochloridates, the 2-chloro-1,3,2-dioxaphospholane compound or the 2-chloro-1,3,2-dioxaphosphorinane compound is reacted with bromine. Thereby the cyclic structure is cleaved, and an atom of bromine adds to either end of the resulting chain, thus:

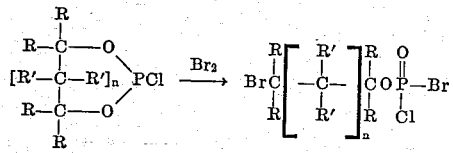

The phosphorobromidochloridates are stable, well-defined compounds which may be employed for a variety of industrial purposes, e.g., as gasoline additives, as cross-linking agents for polymers, and as modifying agents for cellulosic materials and starches. According to the invention, however, they are very conveniently employed for the preparation of phosphates having two bromine-containing ester radicals and one chlorine-containing ester radical. This is achieved by treating the phosphorobromidochloridates with an oxirane compound, e.g., ethylene oxide and certain mono-substitution products thereof. The reaction takes place by cleavage of the oxirane ring and bonding of the cleaved

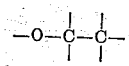

chain through oxygen to the phosphorus atom of the phosphorobromidochloridate, the bromine and chlorine atoms initially bonded to phosphorus adding to the other ends of two such chains, thus:

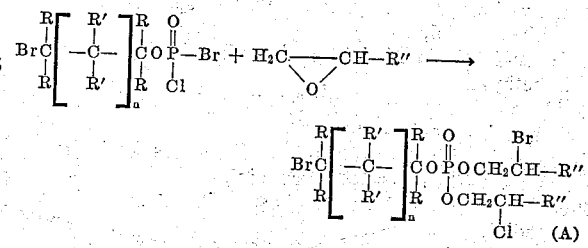

(A)

The above compound A is that which is obtained when the oxirane ring opens between the oxygen atom and the >CHR'' portion of the ring. However, the oxirane ring can open also between the oxygen atom and the >CH₂ portion of the ring. In that case, the phosphates obtained from the phosphorobromidochloridates and the oxirane compound have the formula

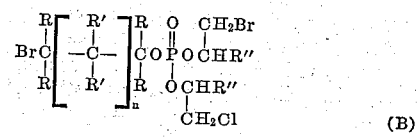

(B)

The ratio of (A) to (B) in the product will depend upon the nature of the oxirane compound and of the reaction conditions. Product A generally predominates, especially under catalytic conditions and/or when R'' is a bulky substituent. However, since both (A) and (B) are useful for substantially the same applications, the presence of both types of ester products in the phosphorobromidochloridate-oxirane reaction product does not generally require isolation of either.

As stated above, the starting materials which are used for preparing the present phosphorobromidochloridates are either 2-chloro-1,3,2-dioxaphospholane compounds which may be prepared from the reaction of phosporus trichloride and the 1,2-diols, or the 2-chloro-1,3,2-dioxaphosphorinane compounds which may be prepared from said chloride and diols of the formula

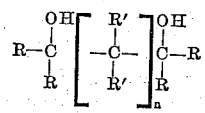

where R, R' and n are as above defined. Examples of those of the presently useful phospholanes and the phosphorinanes and the diols from which they are obtained by reaction with phosphorus trichloride as as follows:

2-chloro-1,3,2-dioxaphospholane from ethylene glycol,
2-chloro-4-methyl-1,3,2-dioxaphospholane from propylene glycol,
2-chloro-4,5-dimethyl-1,3,2-dioxaphospholane from 2,3-butanediol,
2-chloro-4-ethyl-1,3,2-dioxaphospholane from 1,2-butanediol,
2-chloro-4,5-diethyl-1,3,2-dioxaphospholane from 3,4-hexanediol,
2-chloro-4,4-dimethyl-1,3,2-dioxaphospholane from 2-methyl-1,2-propanediol,
2-chloro-4,4,5,5-tetramethyl-1,3,2-dioxaphospholane from 2,3-dimethyl-2,3-butanediol,
2-chloro-4-iodomethyl-1,3,2-dioxaphospholane from 3-iodo-1,2-propanediol,
2-chloro-4,4,5-triethyl-1,3,2-dioxaphospholane from 3-ethyl-3,4-hexanediol,
2-chloro-1,3,2-dioxaphosphorinane from 1,3-propanediol,
2-chloro-5-butyl-5-ethyl-1,3,2-dioxaphosphorinane from 2-butyl-2-ethyl-1,3-propanediol,
2-chloro-5,5-dimethyl-1,3,2-dioxaphosphorinane from 2,2-dimethyl-1,3-propanediol,
2-chloro-4-ethyl-6-methyl-1,3,2-dioxaphosphorinane from 2,4-hexanediol,
2-chloro-4,4,6-trimethyl-1,3,2-dioxaphosphorinane from 2-methyl-2,4-pentanediol,
2-chloro-4-(2-bromoethyl)-1,3,2-dioxaphosphorinane from 5-bromo-1,3-pentanediol,
2-chloro-4-(trifluoromethyl)-1,3,2-dioxaphosphorinane from 4,4,4-trifluoro-1,3-butanediol,
2-chloro-4-pentyl-1,3,2-dioxaphosphorinane from 1,3-octanediol,
2-chloro-5,5-bis(chloromethyl)-1,3,2-dioxaphosphorinane from 2,2-bis(chloromethyl)-1,3-propanediol.

Phosphorobromidochloridates which are obtained by reacting the 2-chloro-1,3,2-dioxaphospholane compound are β-bromoalkyl or β-bromohaloalkyl phosphorobromidochloridates, e.g., bromination of 2-chloro-1,3,2-dioxaphospholane yields 2-bromoethyl phosphorobromidochloridate. Those obtained from the 2-chloro-1,3,2-dioxaphosphorinanes have the bromine atom in the γ-position, i.e., reaction of 2-chloro-1,3,2-dioxaphosphorinane with bromine yields 3-bromopropyl phosphorobromidochloridate. The following table shows other phosphorobromidochloridates which are obtained by bromination of substituted 2-chloro-1,3,2-dioxaphospholanes:

| Substituted 2-chloro-1,3,2-dioxaphospholane | Phosphorobromidochloridate obtained |
|---|---|
| 4-methyl | 2-bromo-1-methylethyl. |
| 4,5-dimethyl | 2-bromo-1-methylpropyl. |
| 4,4,5,5-tetramethyl | 2-bromo-1,1,2-trimethylpropyl. |
| 4-chloromethyl | 2-bromo-1-(chloromethyl)ethyl. |
| 4,5-bis(2-chloroethyl) | 2-bromo-4-chloro-1-(2-chloroethyl)butyl. |
| 4-ethyl-5-methyl | 2-bromo-1-methylbutyl. |
| 4-(2-iodoethyl) | 3-iodo-1-(bromomethyl)propyl. |
| 4,4-diethyl | 2-bromo-1-ethylbutyl. |
| 4,4,5,5-tetrakis(chloromethyl) | 2-bromo-3-chloro-1,1,2-tris(chloromethyl)propyl. |
| 4-ethyl-5-fluoromethyl | 2-bromo-3-fluoro-1-ethyl-propyl. |
| 4,4,5-triethyl | 2-bromo-1,1-diethylbutyl. |
| 4-(2-bromoethyl) | 3-bromo-1-(bromomethyl)-propyl. |
| 4-ethyl | 1-(bromomethyl)propyl. |

Phosphorobromidochloridates prepared according to the invention by bromination of substituted 2-chloro-1,3,2-dioxaphosphorinanes are shown below:

| Substituted 2-chloro-1,3,2-dioxaphosphorinane | Phosphorobromidochloridate obtained |
|---|---|
| 5,5-diethyl | 2-bromomethyl-2-ethylbutyl. |
| 4,5,6-trimethyl | 3-bromo-1,2-dimethylbutyl. |
| 5-chloromethyl | 3-bromo-2-(chloromethyl)-propyl. |
| 5-pentyl | 2-(bromomethyl)heptyl. |
| 4-(2-bromoethyl) | 3-bromo-1-(2-bromoethyl)-propyl. |
| 5,5-dibuty | 2-(bromomethyl)-2-butylhexyl. |
| 4,6-dimethyl | 3-bromo-1-methylbutyl. |
| 5-(3-bromopropyl) | 2-(bromomethyl)-5-bromopentyl. |
| 4,4-dimethyl | 3-bromo-1,1-dimethylpropyl. |
| 5-(trifluoromethyl) | 3-bromo-2-(trifluoromethyl)-propyl. |
| 5-butyl-5-ethyl | 2-bromomethyl-2-ethylhexyl. |
| 5-(2-iodoethyl) | 2-bromomethyl-4-iodobutyl. |
| 4,4,6-trimethyl | 3-bromo-1,1-dimethylbutyl. |
| 4,5,5,6-tetramethyl | 3-bromo-1,2,2-trimethylbutyl. |
| 4-ethyl-5-chloroethyl | 2-bromomethyl-4-chloro-1-ethylbutyl. |
| 5,5-bis(chloromethyl) | 3-bromo-2,2-bis(chloromethyl)-propyl. |

In order to prepare the presently provided mixed phosphates from the phosphorobromidochloridates, the latter are contacted with an oxirane compound, i.e., ethylene oxide or a substitution product thereof in which one of the hydrogen atoms is replaced by an alkyl or haloalkyl radical of from 1 to 5 carbon atoms or by a hydrocarbyloxymethyl radical of from 1 to 8 carbon atoms. A few examples of useful oxirane compounds are propylene oxide, epichlorohydrin, phenyl glycidyl ether and butadienemonoxide. Other examples are shown in the following table of new phosphates which are obtained according to the invention by reaction of the indicated phosphorobromidochloridate with the indicated oxirane compound, with cleavage of the oxirane ring occurring between the oxygen and the substituted carbon atom.

| $\begin{array}{c}\text{O}\\ \|\\ \text{YOP—Br}\\ \|\\ \text{Cl}\end{array}$ | $\text{H}_2\text{C}\overset{\text{O}}{\triangle}\text{CHR}$ | $\begin{array}{c}\text{O}\quad\text{OZ}\\ \|\quad/\\ \text{YOP}\\ \quad\backslash\\ \quad\text{OX}\end{array}$ | |
|---|---|---|---|
| Y= | R= | Z= | X= |
| BrCH₂CH₂— | H— | BrCH₂CH₂— | ClCH₂CH₂— |
| BrCH₂CH₂CH₂— | H— | BrCH₂CH₂— | ClCH₂CH₂— |
| BrCH₂CH(CH₃)— | CH₃— | CH₃CHBrCH₂— | CH₃CHClCH₂— |
| CH₃CHBrCH(CH₃)— | CH₃CH₂— | CH₃CH₂CHBrCH₂— | CH₃CH₂CHClCH₂— |
| CH₃CBr(CH₃)C(CH₃)₂— | CH₃(CH₂)₄— | CH₃(CH₂)₄CHBrCH₂— | CH₃(CH₂)₄CHClCH₂— |
| BrCH₂CH₂CH(CH₂Br)— | C₆H₅OCH₂— | C₆H₅OCH₂CHBrCH₂— | C₆H₅OCH₂CHClCH₂— |
| ClCH₂CH₂CBr(CH₂Cl)CH₂— | CH₃OCH₂— | CH₃OCH₂CHBrCH₂— | CH₃OCH₂CHClCH₂— |
| CH₃CH₂CHBrCH(CH₂CH₃)— | ClCH₂— | ClCH₂CHBrCH₂— | ClCH₂CHClCH₂— |
| BrCH₂CH(CH₂Cl)— | BrCH₂CH₂— | BrCH₂CH₂CHBrCH₂— | BrCH₂CH₂CHClCH₂ |
| ICH₂CH₂CH(CH₂Br)— | CH₂=CH— | CH₂=CHCHBrCH₂— | CH₂=CHCHClCH₂— |
| CH₃CH₂C(CH₂Br)(CH₂CH₃)CH₂— | FCH₂CH₂CH₂— | FCH₂CH₂CH₂CHBrCH₂— | FCH₂CH₂CH₂CHClCH₂— |
| CH₃CHBrCH₂C(CH₃)₂— | CH₃C₆H₄OCH₂— | CH₃C₆H₄OCH₂CHBrCH₂— | CH₃C₆H₄OCH₂CHClCH₂— |
| CH₃(CH₂)₄CH(CH₂Br)CH₂— | ICH₂CH₂— | ICH₂CH₂CHBrCH₂— | ICH₂CH₂CHClCH₂— |
| CH₃(CH₂)₃C(CH₂Br)(CH₃)CH₂— | CH₃CH=CH— | CH₃CH=CHCHBrCH₂ | CH₃CH=CHCHClCH₂— |
| BrCH₂CH₂C(CH₃)₂— | CH₃— | CH₃CHBrCH₂— | CH₃CHClCH₂— |
| BrCH₂CH(CF₃)CH₂— | CH₃CH₂OCH₂— | CH₃CH₂OCH₂CHBrCH₂— | CH₃CH₂OCH₂CHClCH₂— |
| BrCH₂CH₂CH₂— | CH₃(CH₂)₅CH₂OCH₂— | CH₃(CH₂)₅CH₂OCH₂CHBrCH₂— | CH₃(CH₂)₅CH₂OCH₂CHClCH₂— |
| CH₃CHBrCH₂— | Br₃CCH₂CH₂CHBrCH₂— | Br₃CCH₂CH₂CHBrCH₂— | Br₃CCH₂CH₂CHClCH₂— |
| BrCH₂CH₂— | CH≡CCH₂— | CH≡CCH₂CHBrCH₂— | CH≡CCH₂CHClCH₂— |
| BrCH₂C(CH₃)₂CH₂— | cyclohexyloxymethyl | cyclohexyl—O—methyl-CHBrCH₂— | cyclohexyl—O—methyl-CHClCH₂— |
| BrCH₂C(CH₂Cl)₂CH₂— | H— | BrCH₂CH₂— | ClCH₂CH₂— |
| BrCH₂C(CH₂Br)₂CH₂— | ClCH₂— | ClCH₂CHBrCH₂— | ClCH₂CHClCH₂— |

As already stated, the nature of the ester which is obtained by reaction of the phosphorobromidochloridate depends upon the point at which cleavage of the oxirane ring occurs. Since there is a preferential tendency for cleavage to occur between the substituted carbon atom and oxygen, the products are predominantly the β-bromo β-chloro esters of the types shown above for Z and X. However, there is generally also formed varying proportions of the isomeric products which result by cleavage of the oxirane ring between the oxygen atom and the unsubstituted carbon atom. For example, in the third preparation of the above table wherein 2-bromo-1-methylethyl phosphorobromidochloridate is reacted with propylene oxide, in addition to the 2-bromo-1-methylethyl 2-bromopropyl 3-chloropropyl phosphate which is shown in the table, there are also formed isomers such as

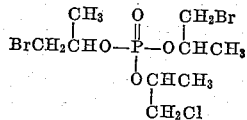

Similarly in the third from last preparation of the above table, in addition to the phosphate shown therein, i.e., 3-bromo-2-methylpropyl 2-bromo-3-cyclohexyloxypropyl 2-chloro-3-cyclohexyloxypropyl phosphate, there are also formed such isomers as

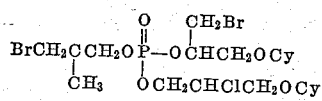

wherein Cy denotes the cyclohexyl radical.

In view of the above, it will be apparent that the invention provides a facile method of preparing numerous phosphates having both chlorine and bromine as substituents in the epoxide-derived portions of the phosphorus esters. The 2-chloro-1,3,2-dioxaphospholane compounds and the 2-chloro-1,3,2-dioxaphosphorinane compounds are readily available starting materials, since they are easily prepared from the 1,2- or 1,3-diols and phosphorus trichloride.

A valuable aspect of the invention provides a method for preparing the phosphates, without isolation of any intermediately formed products, by starting with the diol and the phosphorus trichloride. We have found that reaction of the diol with a phosphorus trichloride proceeds readily in the absence of a diluent or solvent. This permits using the reaction product obtained from the diol and the phosphorus trichloride, without tedious isolation, in the subsequent bromination step. Dispensing with the diluent or solvent also improves the yield of the phospholane or phosphorinane. Hence, a presently preferred method comprises the following steps: The diol and the phosphorus trichloride are mixed together in substantially equimolar proportions in the absence of a solvent or diluent until cessation of hydrogen chloride evolution, the resulting reaction mixture is treated with bromine until cessation of bromine decolorization, and the bromination product thus obtained is reacted with the oxirane compound to give the mixed phosphate. This can all be effected in one reaction vessel, and without isolating any intermediate products. The mixed phosphate thus obtained may be used directly for a variety of industrial or agricultural purposes; but if desired, the phosphate product may be purified, e.g., by washing with aqueous alkali and water, or by distillation.

In the first step, when working in the absence of extraneous diluents or solvents, reaction proceeds readily and usually without the application of external heating. Isolation of the phospholane or phosphorinane is not required because reaction of the glycol with the phosphorus trichloride proceeds substantially to completion; likewise, the bromination and the subsequent reaction with the oxirane compound proceeds so smoothly and completely that there is no occasion for the presence of appreciable quantities of materials other than the desired phosphate product in the final reaction mixture. Since the bromination and the oxirane reaction both involve addition, no by-product formation is involved; and because both reactions are easily carried to completion, no separation of unconsumed reactants is necessitated. An important aspect of the present invention is thus the method of preparing mixed phosphates which comprises addition of bromine to a cyclic phosphorus compound of the formula

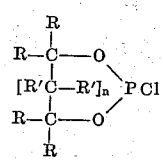

wherein R is selected from the class consisting of hydrogen and alkyl and haloalkyl radicals of from 1 to 2 carbon atoms, R' is selected from the class consisting of hydrogen and alkyl and haloalkyl radicals of from 1 to 5 carbon atoms, and n is an integer of zero or one, until cessation of bromine discoloration, and then treating the resulting reaction product with an oxirane compound of the formula

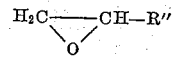

wherein R" is selected from the class consisting of R' and hydrocarbyloxymethyl radicals of from 1 to 7 carbon atoms and wherein one R" at a pair of adjacent carbon atoms must be hydrogen.

Of course, if desired, the presently provided mixed phosphates can also be prepared by starting with the phosphorobromidochloridates. This is particularly advantageous when it is desired to prepare a number of different kinds of esters having one common alcohol residue, i.e., that which is present in the phosphorobromidochloridate. Thus, 2-chloro-1,3,2-dioxaphospholane can be brominated to give a large stock of 2-bromoethyl phosphorobromidochloridate which can then be stored and converted at any time to various phosphates by reaction with an oxirane compound. For example, reaction of the 2-bromoethyl phosphorobromidochloridate with ethylene oxide gives bis(2-bromoethyl) 2-chloroethyl phosphate; with phenyl glycidyl ether it gives predominantly 2-bromoethyl 2-bromo-3-phenoxypropyl 2-chloro-3-phenoxypropyl phosphate; and with butadiene monoxide it gives predominantly 2-bromoethyl 2-bromo-3-butenyl 2-chloro-3-butenyl phosphate. An important aspect of the invention is thus the provision of a process for the preparation of mixed phosphates which comprises reacting a phosphorobromidochloridate of the formula

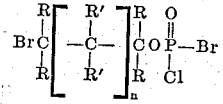

wherein R, R' and n are as above defined, with an oxirane compound of the formula

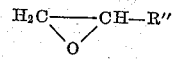

wherein R" is as above defined.

In preparing the phosphorobromidochloridate from the 2-chloro-1,3,2-dioxaphospholane compound or the 2-chloro-1,3,2-dioxaphosphorinane compound, no special conditions are involved. Bromine is simply added to the phospholane compound or the phosphorinane compound until decolorization of the bromine is no longer obtained. So long as reaction is taking place, the bromine is decolorized substantially as rapidly as it is added. Ordinary room temperature generally suffices; however, in order better to follow the course of the reaction, especially in experimental runs, the reaction may be moderated by cooling or by the use of an inert liquid diluent. When the bromine ceases to become decolorized, reaction is complete, i.e., the phospholane compound or the phosphorinane compound has been converted to the phosphorobromidochloridate.

Since formation of the phosphorobromidochloridate takes place by reaction of one mole of the phospholane compound or of the phosphorinane compound with one mole of bromine, these reactants are advantageously used in such stoichiometric proportions. An excess of either reactant can be used, of course, since such an excess would involve only the necessity of removing the unreacted material from the bromination product.

The presently provided phosphorobromidochloridates are stable, well-characterized compounds which are advantageously employed for purposes other than for the preparation of mixed phosphates. The chlorine and bromine atoms which are attached to the phosphorus atom are both very reactive; hence esters may be prepared therefrom by reaction with alcohols or thiols, and phosphoramides by reaction with amines. The chlorine and bromine atoms display different degrees of reactivity, so that in many instances partial esters or amides are obtained. The phosphorobromidochloridates are also advantageously employed as treating agents for cellulosic materials and other substances having a plurality of hydroxy groups, e.g., polyvinyl alcohol, and the sugars and starches. Reaction of the phosphorobromidochloridates with such materials generally imparts flame-proofing properties thereto and, depending upon the nature of the individual phosphorobromidochloridate, and the material treated therewith, there will be obtained, in addition to the flame-retardance, an improvement in hand and feel, crease-resistance, etc.

As stated above, the phosphorobromidochloridates are particularly valuable as starting materials for the production of mixed phosphates containing both bromine and chlorine. Reaction of the phosphorobromidochloridates with ethylene oxide, or the other oxirane compounds disclosed above, to give the mixed esters generally proceeds substantially quantitatively; and since the reaction is one of addition, here again, as in the case of the phosphorobromidochloridate preparation, there is involved no formation of by-products. Since production of the triorgano phosphate involves addition of two moles of the oxirane compound to one mole of the phosphorobromidochloridate, these reactants are advantageously used in such stoichiometric proportion; however, an excess of the alkylene oxide may be used because any unreacted material can be separated from the desired phosphate product. In some instances it may be advantageous to react the phosphorobromidochloridate with an equimolar amount of one epoxide, and then to complete the reaction by use of a different epoxide; or other than equimolar quantities of the two epoxides may be employed.

Reaction of the phosphorobromidochloridate with the oxirane compound to give the presently provided phosphates proceeds at ordinary, decreased or increased temperatures and in the presence or absence of catalysts, e.g., a Lewis acid. The use of catalysts is preferred in that reaction time is thereby very substantially decreased, use of lower reaction temperature is facilitated, and yields of phosphate product are materially improved. As catalysts there may be employed, e.g., such compounds as titanium tetrachloride, zirconium tetrachloride, aluminum chloride, ferric chloride, boron trifluoride, tin tetrachloride, iron filings, ammonium metavanadate, phosphorus trichloride, phosphorus tribromide, pyridine, tri-n-butylamine, quinoline, aniline, N,N-diethylaniline, etc. Inert liquid diluents may or may not be employed. The reaction is generally conducted at moderately elevated temperatures; but depending upon the nature of the individual reactants and upon the nature of catalyst, temperatures of, say, from $-15°$ C. to $100°$ C. may be used. The addition reaction is generally exothermic; hence in initial runs it is advisable to employ external cooling. Heating may be required to assure completion of the reaction and may be desirable throughout the reaction when using the less reactive, higher alkylene oxides or when operating either in the absence of a catalyst or in the presence of catalyst materials of comparatively low efficiency. The selection of the proper operating temperature as related to nature of reactants, catalyst and the quantities thereof can easily be arrived at by one skilled in the art.

The presently provided mixed phosphates are useful for a variety of industrial purposes, e.g., as fuel additives, lubricant additives and as solvents. They are particularly useful as modifiers for natural and synthetic polymeric materials. The present phosphates possess a high degree of utility as flame-retardants for polymeric materials. At the same time, depending upon the quantity of the mixed ester which is in contact with the polymer, plasticizing or softening effect is obtained. Thus, at, say, a 10% to 50% concentration of the phosphate, based on the total of polymer and phosphate, the polymer generally not only is flame-proofed but also plasticized. Use of the present phosphates at much lower concentrations, say, in an amount which is some cases is as low as 1.0%, provides many polymeric systems with reduced burning rates. The present phosphates may be used with the polymers in a quantity which is equal to that of the polymer, but in most instances favorable results with respect to improvement in flame-retardance and/or plasticity is obtained at concentrations which are definitely lower. It will be evident, of course, that for the preparation of plastisols, quantities of the phosphate which are greater than that of the polymer will be required. Use of the present phosphorus compounds with the polymeric materials in quantities which confer beneficial properties to the polymers with respect to a desired effect, e.g., flexibility in the case of a film, flame-proofing in the case of foam insulators and extruded fibers or molded pieces, often confers to the polymer an improvement also in such characteristics as resistance to impact, dimensoinal stability, moldability, etc. These varied effects are readily determinable by those skilled in the art simply by visual observation or by use of conventional techniques. Hence in order to arrive at optimum beneficial effect suited to the purposes for which the polymeric composition is designed, only routine testing, involving variation of adjuvant quantity, is generally required, although in some instances one or more members of the whole class of the presently provided phosphates will be found to impart a degree of modification at a low concentration which can be attained by other members of the class at significantly higher concentrations.

Fibrous cellulosic products are prime examples of the natural polymeric materials which are advantageously modified by the present phosphates. This includes products made of cotton, linen, regenerated cellulose, kapok, hemp, wood and wood pulp, e.g., textiles, twines, paper, cardboard, pressed board, batting wood flour, sawdust, etc. Another group of natural polymers of carbohydrate origin includes the starches such as those derived from corn, barley, potato and cassava. Another class of natural polymers with which the present phosphates are beneficially used are the natural gums, e.g., agar, gum arabic, psyllium seed, tragacanth and gum karaya. Natural rubber is also included. Natural resins modified by the present phosphates include shellac, copal, damar, pine balsam, rosin, etc. Proteinaceous polymeric materials, e.g., animal glue, casein, wool and leather are also advantageously modified by said phosphorus compounds. The natural polymeric products, generally, are rendered flame-retardant when contacted with the present phosphates in appropriate proportions, and worthy of special comment is the glow-proofing of readily ignitible dusts and powders prepared from the natural polymers. Plasticizing effect is conferred by the present phosphates to those of the polymers which lack the degrees of softness and flexibility that are required in the applications for which the polymers are destined. When cotton fibers or textiles are treated with the phosphate compounds, there is not only flame-retardant effect but also an improvement in the "hand" or feel of the fabric.

Synthetic polymeric materials, i.e., those high molecular weight materials which are not found in nature, with which the present phosphates are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class consists of the polymerized vinyl and vinylidene compounds, i.e., those having the $CH_2=C<$ radical. Compounds having such a radical are, e.g., the solid polymeric alkenes, such as polyethylene, polypropylene, polyisobutylene or ethylenepropylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2-(cyanoethoxy)ethyl 3-(3-cyanopropoxy)propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene; polyvinyl alcohol; the vinyl carboxylates such as vinyl acetate, vinyl chloroacetate, vinyl propionate, and vinyl 2-ethylhexanoate; the N-vinyl imides such as N-vinylphthalimide and N-vinyl-succinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present phosphates. Examples of such copolymers or terpolymers are those obtained by polymerization of the following monomer mixtures: vinyl chloride-vinyl acetate, acrylonitrile-vinylpyridine, styrene-methyl methacrylate; styrene-N-vinylpyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group, $>C=C<$, are the homopolymers, copolymers and terpolymers of the α,β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the present phosphates are also the polymers and copolymers of unsaturated, cyclic esters of carbonic acid, e.g. homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the present phosphates are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer or 2-chlorobutadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinylbenzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile, are likewise modified in properties by the present phosphates to give polymeric materials of enhanced utility.

Polymeric materials with which the present phosphates can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylenephosphonic acid and styrenephosphonic acids and their salts, esters and amides; the silanes such as dimethylvinylsilane, diphenylvinylsilane and methylphenylvinylsilane, etc.

A class of synthetic polymeric materials with which the present phosphorus compounds are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphorus compounds may be incorporated into films of such cellulose derivatives by adding them to the solutions from which the films are cast or into the melts from which the fibers are extruded.

The present phosphates are particularly suited to the modification of liquid resin compositions of the polyester type, e.g., the linear polyesters which are obtained by the reaction of one or more polyhydric alcohols with one or more α,β-unsaturated polycarboxylic acids alone or in combination with one or more saturated polycarboxylic acid compounds, or the cross-linked polyester resins which are obtained by reacting the linear polyester with a compound containing a $CH_2=C<$ group.

The cross-linking component of the presently modified polyester resin may be, e.g., styrene, the nuclear or side-chained substituted styrenes such as 3,4-dichlorostyrene, α-chlorostyrene, α-methylstyrene; other vinyl-substituted hydrocarbons such as α- or β-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present compounds are compatible and are advantageously used. These resins are condensation products formed by the reaction of a polyhydroxy compound and epichlorohydrin, which condensation products are subsequently cured by addition of cross-linking agents. The hydroxy compound may be, e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present phosphates. The polyurethanes, like the abovementioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters or polyesteramides used for the production of the polyurethane may be branched and/or linear, e.g., the esters of adipic, sebacic, 6-amino-caproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-($\beta$-hydroxyethyl)ether, etc. and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600, etc., dipropylene glycol, tripropylene glycol, trithiopropylene glycol, polypropylene glycols 400, 750, 1,200 and 2,000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenyl methane triisocyanate, 1,5-naphthalene diisocyanate or polyisocyanates in a blocked or inactive form such as the bisphenyl carbamates of toluylene diisocyanate, p,p'-diphenylmethane diisocyanate, p-phenylene diisocyanate and 1,5-naphthalene diisocyanate, etc.

For preparation of the flame-retardant polyurethanes, the present phosphorus compounds are preferably added to a mixture of the reactants and catalyst before hardening. The hardened molded pieces or foams are rendered flame-retardant by the inclusion therein of the phosphate in quantities of, say, from 2% to 25% by weight of the polyurethane. Simultaneous plasticizing property is evidenced and continues to be demonstrated until the quantity of phosphate is substantially equal to that of the polyurethane. Use of the present phosphates in the polyurethane foams can also increase flexibility and, in some applications, improve the mechanical properties of the foams.

Phenolic resins are also beneficially modified by the present phosphates, which compounds are incorporated into the resin either by milling in molding applications or by addition to film-forming or impregnating and bonding solutions previous to casting. Phenolic resins with which the present compounds are employed are, for example, the phenol-aldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present phosphates. Examples thereof are the heat-convertible condensation products of an aldehyde with urea, thiourea, guanidine, cyanamide, dicyandiamide, alkyl or aryl guanamines, and the triazines such as melamine, 2-chloro-4,6-diamino-1,3,5-triazine and 2-hydroxy-4,6-diamino-1,3,5-triazines. The present adjuvants are compatible with the aminoplasts; and depending upon the quantity of phosphate used, they serve to plasticize them, and to render them fire-retardant. When the aminoplasts are destined for use as impregnating agents, bonding adhesives, coatings and casting of films, the phosphorus compounds are incorporated into solutions or suspensions in which the aminoplast is carried. The resulting mixtures give strong, fire-retardant laminates when sheets of paper, glass cloth or fabric are impregnated therewith and cured.

Also beneficially modified by the present phosphates are the nylons, i.e., the superpolyamides which are generally obtained by the condensation of a diamine, e.g., hexamethylenediamine with a dicarboxylic acid, e.g., adipic acid. Depending upon the quantity of phosphate employed and the individual nature of the compound, there are obtained flame-retardant, dye receptor, and/or plasticizing effects.

Other polyamides with which the present phosphates are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenylalanine anhydride; the polymeric lactams, e.g., polycaprolactam, piperidone, 2-oxohexamethyleneimine and other cyclic amides. The present phosphates can be incorporated into molding or extruding compositions for plasticizing and flame-retardant effect and/or to serve as mold lubricants.

The present phosphates are also advantageously employed as adjuvants for polymeric aldehydes, e.g., homopolymeric, high-molecular weight formaldehyde.

The present phosphates are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present phosphates are plasticizing flame-retardants for such self-condensation products, generally; and where transparentizing effect and dye receptivity are lacking, the phosphates are often instrumental in ameliorating such deficiencies.

The present mixed phosphates are likewise advantageously employed with the silicone resins, i.e., the linear polymers which have the repeating unit:

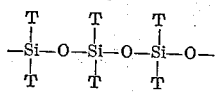

where T denotes an organic radical such as the methyl or phenyl radical, as well as the cross-linked modifications thereof, e.g., cross-linked polymeric divinyltetramethyldisiloxane. The present phosphates have a beneficial effect on the mold shrinkage properties and the dimensional stabilities of the thermo-setting polymers and also impart plasticizing and transparentizing effects. In bonding and laminate applications tensile strength properties of the siloxane resins are improved.

The invention is further illustrated by, but not limited to, the following examples:

Example 1

To 1221 g. (9.66 moles) of 2-chloro-1,3,2-dioxaphospholane there was added 1521.5 g. of bromine (to the point of persistent bromine color) during a time of 0.7 hour while maintaining the temperature of the reaction mixture at 10–20° C. by Dry Ice cooling. A 9.5 g. portion of the reaction mixture was submitted for nuclear magnetic resonance study; a phosphorus chemical shift was observed at +14.9 relative to $H_3PO_4$. Another 95.5 g. portion of the reaction mixture was distilled through a 6″ column to give 91.1 g. of the substantially pure 2-bromoethyl phosphorobromidochloridate, B.P. 80–81° C./0.2 mm. $n_D^{25}$ 1.5225.

The remainder of the bromination product obtained above was warmed to 50° C. and 4.1 g. of titanium tetrachloride was added thereto to serve as catalyst for subsequent reaction with ethylene oxide. Addition of the oxide was started at 50° C. and during passage of 770 g. of the oxide into the reaction mixture the temperature rose to 62° C. It was allowed to increase to 90° C. as another 82 g. of the oxide was added, and finally to a temperature of 105° C. as the remainder of the total 900 g. of oxide was added. The whole was maintained at 105–120° C. for 0.75 hour and then concentrated to 130° C./1 mm. to give as residue 3419 g. (98.2% of theory based on the 2-chloro-1,3,2-dioxaphospholane) of the substantially pure bis(2-bromoethyl) 2-chloroethyl phosphate, $n_D^{25}$ 1.5003. Distillation of a 253 g. portion gave 229.7 g., B.P. 180–182° C./0.1 mm., which analyzed as follows:

|  | Found | Calc'd for $C_6H_{12}Br_2ClO_4P$ |
|---|---|---|
| Percent Br | 42.74 | 42.75 |
| Percent Cl | 9.28 | 9.46 |
| Percent P | 8.04 | 8.28 |

Example 2

This example shows preparation of bis(2-bromoethyl) 2-chloroethyl phosphate on a larger scale.

To 2,532 g. (20.0 moles) of 2-chloro-1,3,2-dioxaphospholane there was added during 0.8 hour 3151 g. of bromine while maintaining the temperature of the reaction mixture at 10–25° C. The rate of addition was determined by the rate of heat removal, since the bromine reacted instantaneously. A 6.5 g. sample was removed for NMR study. It had a chemical shift of +15.1 p.p.m. which is characteristic of 2-bromoethyl phosphorobromidochloridate.

The remainder of the bromination product was warmed to 45° C. and 6 g. of titanium tetrachloride catalyst was added thereto. A total of 1810 g. of ethylene oxide was passed into the resulting mixture in 3 hours as the temperature was allowed to rise to 120° C. Another 120 g. of the oxide was introduced while applying heat to maintain the temperature at 115–121° C. When the total 1930 g. of oxide had been added, the reaction mixture was concentrated to 130° C./1 mm. to give as residue 7,283 g. (97.3% theoretical yield based on the phospholane) of the substantially pure bis(2-bromoethyl) 2-chloroethyl phosphate; NMR chemical shift, +1.7 p.p.m.; $n_D^{25}$ 1.5004; $d_{25°}^{25°}$ 1.7797; and analyzing as follows:

|  | Found | Calc'd for $C_6H_{12}Br_2ClO_4P$ |
|---|---|---|
| Percent C | 19.62 | 19.24 |
| Percent H | 3.37 | 3.23 |
| Percent Br | 42.40 | 42.75 |
| Percent Cl | 9.26 | 9.46 |
| Percent P | 8.10 | 8.28 |

Example 3

To 84.3 g. (0.50 mole) of 2-chloro-5,5-dimethyl-1,3,2-dioxaphosphorinane there was gradually added during 0.25 hour 80.5 g. (101% of theory) of bromine while maintaining the reaction mixture at a temperature of 10–20° C. by means of Dry Ice cooling. At the end of that time a 7.0 g. sample was removed for analysis and another 41 g. of the reaction mixture was distilled to give 37.9 g. of the substantially pure 3-bromo-2,2-dimethylpropyl phosphorobromidochloridate, B.P. 92–94° C./0.05 mm., which analyzed as follows:

|  | Found | Calc'd for $C_5H_{10}Br_2ClO_2P$ |
|---|---|---|
| Percent Br | 49.03 | 48.7 |
| Percent Cl | 11.15 | 10.8 |
| Percent P | 9.57 | 9.44 |

The remainder of the bromination product was warmed to 40° C., 5 drops of titanium tetrachloride was added, and to the resulting mixture there was introduced 50.7 g. (0.874 mole, 25% excess) of propylene oxide during a time of 0.3 hour. Approximately the first half of the oxide was added at 50–60° C., employing cooling. The remainder, which was added without cooling, was introduced at a rate which caused rapid reflux (60–75° C.).

After all of the propylene oxide had been added, the temperature of the reaction mixture rose spontaneously to 78° C. within 0.1 hour. It was then warmed to 102° C. within 0.4 hour and finally concentrated to 130° C./0.1 mm. to give as residue 156 g. (99% theoretical yield) of the substantially pure 3-bromo-2,2-dimethylpropyl 2-chloropropyl 2-bromopropyl phosphate. Nuclear magnetic resonance gave a single peak at +3.0 p.p.m. relative to $HP_3O_4$. The phosphate analyzed as follows:

|  | Found | Calc'd for $C_{11}H_{22}Br_2ClO_4P$ |
|---|---|---|
| Percent C | 29.88 | 29.70 |
| Percent H | 4.79 | 4.98 |
| Percent Br | 36.24 | 36.00 |
| Percent Cl | 7.77 | 7.97 |
| Percent P | 6.87 | 6.97 |

Example 4

To an ice-cooled solution consisting of 126.5 g. (1.0 mole) of 2-chloro-1,3,2-dioxaphospholane in 100 g. of carbon tetrachloride there was added, during a time of 0.2 hour, 159.8 g. (1.0 mole) of bromine. During the addition of the bromine, the temperature of the reaction mixture was 5–10° C., and the bromine was decolorized as rapidly as it was added. An 8.0 g. sample of the reaction mixture was removed for nuclear magnetic resonance study. It was thus determined to be 2-bromoethyl phosphorobromidochloridate, the chemical shift for phosphorus which was observed being a major peak at +15.7 p.p.m. (relative to $H_3PO_4$).

To the solution containing 2-bromoethyl phosphorobromidochloridate which remained after withdrawal of the 8.0 g. sample, there was added 5 drops of titanium tetrachloride and then, during 0.3 hour, there was introduced to the resulting mixture 121 g. (2.09 mole, 4.5% excess) of propylene oxide. During addition of the oxide, cooling was employed to maintain the temperature of the reaction mixture at 50–55° C. When all of the propylene oxide had been added and cooling had been discontinued, the reaction mixture warmed spontaneously to reflux and reached a maximum of 62° C. in 0.2 hour. It was then warmed to 100° C. within 1.5 hours. After removal of an analytical sample, about 100 ml. of benzene was added, the solution was washed with water, dried over $CaCl_2$, and concentrated to 100° C./0.1 mm. to give as residue 247 g. of substantially pure 2-bromoethyl 2-bromopropyl 2-chloropropyl phosphate having a single characteristic phosphorus NMR chemical shift at +3.3 p.p.m. (relative to $H_3PO_4$).

Example 5

Bromine was introduced during a time of 0.6 hour into 126.5 g. (1.0 mole) of 2-chloro-1,3,2-dioxaphospholane while maintaining the temperature of the reaction mixture at 5°–20° C. by means of Dry Ice cooling. Essentially 1.0 mole of bromine was employed, all of this quantity being rapidly decolorized by the dioxaphospholane.

To the 2-bromoethyl phosphorobromidochloridate there was added 10 drops (about 1 g.) of titanium tetrachloride and to the resulting mixture there was added during 0.2 hour at a temperature of 55–65° C., 194 g. (2.1 moles, 5% excess) of epichlorohydrin. Mild cooling was employed while the reaction mixture was subsequently maintained at 70–75° C. for 0.25 hour and at 80–85° C. for another 0.2 hour. When there was no further evidence of exothermic reaction, the reaction mixture was warmed at 95–105° C. for 0.75 hour and then allowed to stand overnight at room temperature. At the end of that time it was concentrated to a pot temperature of 130° C./0.1 mm. (whereby 18.0 g. of colorless liquid, probably largely unreacted epichlorohydrin, was recovered) to give as residue 451.5 g. (97.3% theoretical yield) of the substantially pure 2-bromoethyl 2-bromo-3-chloropropyl 2,3-dichloropropyl phosphate, a yellow liquid which analyzed as follows:

|  | Found | Calc'd for $C_8H_{15}Br_2Cl_3O_4P$ |
|---|---|---|
| Percent C | 20.19 | 20.4 |
| Percent H | 3.00 | 3.0 |
| Percent Br | 33.37 | 34.0 |
| Percent Cl | 22.56 | 22.6 |

Example 6

Bromine (645 g., 4.03 moles) was added during 0.25 hour at a temperature of 15–21° C. to 674 g. (4.0 moles) of 2-chloro-5,5-dimethyl-1,3,2-dioxaphosphorinane. The product thus obtained was the substantially pure 3-bromo-2,2-dimethylpropyl phosphorobromidochloridate.

To 322.0 g. (0.98 mole) of the above phosphorobromidochloridate there was added 0.66 g. of titanium tetrachloride to serve as catalyst for conversion of the phosphorobromidochloridate to phosphate. Butadiene monoxide (151 g., 2.15 moles, 10% excess) was then added to the resulting mixture during 0.2 hour while maintaining the temperature at 40–70° C. When all of the monoxide had been added, the whole was maintained, with cooling, at 70–80° C. for 0.2 hour and then gradually allowed to reach a temperature of 101° C. spontaneously. When there was no further evidence of exothermic reaction, the mixture was warmed to 120° C. and finally concentrated to 120° C./0.1 mm. to give as residue 435 g. (95% theoretical yield) of a mixture of phosphates consisting essentially of 3-bromo-2,2-dimethylpropyl 2-bromo-3-butenyl 2-chloro-3-butenyl phosphate and a minor proportion of the isomeric 3-bromo-2,2-dimethylpropyl 1-bromomethyl-2-propenyl 1-chloromethyl-2-propenyl phosphate.

Example 7

Bromination of 2-chloro-4-(chloromethyl)-1,3,2-dioxaphospholane was effected by passing 51.5 g. (0.32 mole) of bromine into 56.5 g. (0.32 mole) of the phospholane during 0.2 hour while maintaining the temperature at 15–20° C. with cooling. A 4.5 g. sample of the product which was removed for analysis showed it to be an alkyl phosphorobromidochloridate having 3 carbon atoms in the alkyl group and both bromine and chlorine substitution, probably essentially 2-bromo-1-(chloromethyl)ethyl phosphorobromidochloridate with a minor proportion of 2-bromo-3-chloropropyl phosphorobromidochloridate.

To the product prepared above there was added 0.4 g. of ammonium metavanadate as catalyst for conversion to phosphate, and 97.7 g. (0.65 mole, 5% excess) of phenyl glycidyl ether was added to the resulting mixture at a rate to maintain the temperature at 80–100° C. with cooling. When addition was completed, the whole was kept at 90–100° C. until heat of reaction had diminished. The reaction was then completed by warming at 115–130° C. for 0.3 hour. After standing overnight it was concentrated to 130° C./0.2 mm. to give as residue 199.5 g. of phosphate product consisting essentially of 2-bromo-1-(chloromethyl)ethyl 2-bromo-3-phenoxypropyl 2-chloro-3-phenoxypropyl phosphate together with minor amounts of isomeric 2-bromo-3-chloropropyl 2-bromo-3-phenoxypropyl 2-chloro-3-phenoxypropyl phosphate, 2-bromo-1-(chloromethyl)ethyl 1-(bromomethyl)-2-phenoxyethyl 1-(chloromethyl)-2-phenoxyethyl phosphate and 2-bromo-3-chloropropyl 1-(bromoethyl)-2-phenoxyethyl 1-(chloromethyl)-2-phenoxyethyl phosphate.

Example 8

This example shows preparation of bis(2-bromoethyl) 2-chloroethyl phosphate by reaction of ethylene glycol with phosphorus chloride to give 2-chloro-1,3,2-dioxaphospholane, reaction of the latter with bromine and subsequent reaction of the brominated product with ethylene oxide.

To 433 g. (3.15 moles) of phosphorus trichloride cooled to 12° C. there was added during 1.0 hour 186.2 g. (3.0 moles) of ethylene glycol. Only slight cooling was required to maintain the temperature of the reaction mixture below 15° C. When all of the glycol had been introduced, the colorless reaction mixture was stirred at 14–17° C. for about 0.1 hour, placed under water pump vacuum, and finally warmed at reflux (47° C.) for 0.3 hour in order to remove by-product hydrogen chloride and any unreacted phosphorus trichloride. A 5.0 g. sample of the 2-chloro-1,3,2-dioxaphospholane thus obtained was removed for study and the remainder of the product was cooled as bromine was added thereto until decolorization was no longer obtained. A total of 454 g. (95% of theory) of bromine was thus added during 0.4 hour at 15–20° C. The reaction mixture thus obtained was substantially pure 2-bromoethyl phosphorobromidochloridate. A 6 g. sample thereof was removed for analysis, and 15 drops of titanium tetrachloride was added to the remainder to serve as catalyst for subsequent reaction of the 2-bromoethyl phosphorobromidochloridate with ethylene oxide. A total of 270 g. of the oxide was introduced with a slow stream of nitrogen below the liquid surface over a period of 0.9 hour. The first 100 g. of the oxide was added at 55–60° C., the second 100 g. at 60–70° C., and the last 70 g. was added while the temperature was allowed to climb to 110° C. When all of the ethylene oxide had been added, the whole was warmed at 95–110° C. for an additional 0.5 hour. It was then concentrated to 130° C./0.01 mm. to give as residue 1030 g. (97.6% of theory based on the bromine or 92.7% based on the ethylene glycol) of the substantially pure bis(2-bromoethyl) 2-chloroethyl phosphate which analyzed as follows:

|  | Found | Calc'd for $C_6H_{12}Br_2ClO_4P$ |
|---|---|---|
| Percent C | 19.23 | 19.24 |
| Percent H | 3.36 | 3.23 |
| Percent Br | 42.99 | 4.75 |
| Percent Cl | 9.19 | 9.46 |
| Percent P | 8.50 | 8.28 |

Nuclear magnetic resonance study of the phosphate gave a characteristic peak of +1.7 p.p.m. relative to $H_2PO_4$.

*Example 9*

This example shows the use of a crude non-distilled 2-chloro-1,3,2-dioxaphospholane for preparation of phosphate via the phosphorobromidochloridate and washing of the phosphate product to remove impurities introduced in the initially used phospholane.

2-bromoethyl phosphorobromidochloridate was prepared by adding 928.5 g. (5.81 moles) of bromine to 760 g. (6.0 moles) of crude 2-chloro-1,3,2-dioxaphospholane during a time of 0.4 hour while maintaining the temperature of the reaction mixture at 10–20° C. with Dry Ice cooling.

The 2-bromoethyl phosphorobromidochloridate thus obtained was warmed to 45° C., and 1.0 g. of titanium tetrachloride was added to serve as catalyst for subsequent reaction with ethylene oxide. The mixture of phosphorobromidochloridate and catalyst was treated with 570 g. (12.9 moles) of ethylene oxide during 1.25 hours while maintaining the temperature of the reaction mixture at 60–65° C. during addition of about one-half of the ethylene oxide and allowing the temperature to increase gradually to 102° C. while the remainder of the oxide was added. The whole was then warmed at reflux (102–108° C.) for 0.5 hour and finally concentrated to 100° C./1 mm. to give as residue 2124 g. of the crude bis(2-bromoethyl) chloroethyl phosphate. Purification was effected by washing a 600 g. portion of the crude phosphate, first with two 200 g. portions of 5% aqueous sodium bicarbonate and then twice with water. The product was dried by concentrating to 100° C./0.5 mm. There was thus obtained 556 g. of the substantially pure bis(2-bromoethyl) 2-chloroethyl phosphate having an NMR chemical shift at +1.9 p.p.m., relative to $H_3PO_4$.

*Example 10*

Finely ground polystyrene was blended with either bis(2-bromoethyl) 2-chloroethyl phosphate or with tris(2,3-dibromopropyl) phosphate, using a quantity of one of said phosphates equal to 4.0% by weight of the polystyrene. The resulting blends were extruded and pelletelized on a 1½″-extruder at 375° F. The blend which contained the bis(2-bromoethyl) 2-chloroethyl phosphate was molded at 500° F. into physical test specimens on an 8-oz. Reed injection molding machine to give colorless, molded test specimens. Under the same conditions, the blend which contained the tris(2,3-dibromopropyl) phosphate could not be molded a tall owing to excessive carbonization and increased fluidity.

The molded specimens were tested for flame-retardance as follows: The specimens were subjected to repeated (3) ignition with a Bunsen burner flame for 10 second periods in a draft-free hood. After each ignition period, upon removal of the flame, the specimens were found to be self-extinguishing in less than 5 seconds after removal of flame, whereas a "control" test specimen, i.e., a similarly molded polystyrene which did not contain an additive, continued to burn rapidly, drip flame, and emit heavy black smoke after the first ignition period. The bis(2-bromoethyl) 2-chloroethyl phosphate had thus rendered the polystyrene self-extinguishing.

Operating as above, test specimens were prepared containing 5% by weight, based on the weight of the polystyrene, of one of the following compounds:

2-bromoethyl 2-bromopropyl 2-chloropropyl phosphate 2-bromoethyl 2-bromo-3-chloropropyl 2,3-dichloropropyl phosphate 3-bromo-2,2-dimethylpropyl 2-bromopropyl 2-chloropropyl phosphate Extruded test specimens which were transparent and colorless were obtained from all three blends. When submitted to the burning test described above, the specimens from all three blends were found to be self-extinguishing.

*Example 11*

The following compounds were tested for flame-retardant effect on rigid polyurethane foams.

(I) Bis(2-bromoethyl) 2-chloroethyl phosphate
(II) 2-bromoethyl 2-bromopropyl 2-chloropropyl phosphate
(III) 2-bromoethyl 2,3-dichloropropyl 2-brom-3-chloropropyl phosphate Testing was conducted using the following formulation:

| | Parts by weight |
|---|---|
| 2,4-toluylene diisocyanate | 36.60 |
| Polyether triol | 63.40 |
| Trichlorofluoromethane (Freon 11) | 12.60 |
| Silicone oil (Dow-Corning, 500 Fluid) | 0.30 |
| Tin catalyst | 0.03 |
| One of the above phosphates | 10.00 |

The above formulations were stirred thoroughly, poured into molds and allowed to set to rigid foams at room temperature. Testing of the resulting hardened, rigid foams for flame-retardance, employing the American Society for Testing Materials procedure, "Tentative Method of Test for Flammability of Plastic Foams and Sheeting,"

designation D1692–59T, showed all of the specimens to have been rendered flame-retardant, whereas the "control," i.e., a hardened, rigid foam prepared from formulations containing all of the above constituents in the same quantities except that no phosphate was present, burned vigorously after being removed from the flame until they were completely consumed.

The hardened foams prepared above were also tested for resistance to humidity by maintaining them for one week in a chamber at 72° C. and 95% relative humidity, and then testing their mechanical strength, employing the American Society for Testing Materials procedure, "Tentative Methtod of Test for Compressive Strength of Rigid Cellular Plastics," designation D1621–59T. The following instrument readings were obtained on discs (2″ diameter, 1½″ thickness) of the hardened, rigid foams.

| Additive: | Load, lbs. |
| --- | --- |
| I | 114 |
| II | 126 |
| III | 132 |
| Control | 106 |

Since the quantity of the present phosphate which is employed with the polymeric material will vary with the adjuvant effect sought, with the nature of the polymer and the nature of the individual phosphate, it is evident that no rigid limits of phosphate content can be set forth. For many purposes, particularly when only reduction of burn-rate, rather than self-extinguishing properties, is desired, as little as 1% or even less can be used. For other purposes, e.g., plasticizing effect, concentrations may be from about 5% to 50% by weight of the polymer give useful results. Determination of the optimum quantities is readily conducted by routine procedures, as will be apparent to those skilled in the art. Variations of the phosphates and quantities employed in the examples can be made to accommodate different requirements. The same processes as illustrated in the above examples have been found to be satisfactory for employing different vinyl polymers, or different condensation polymers than those used in the examples.

Although the present phosphates confer a variety of beneficial properties to polymeric materials, they may be used with other additives which are customarily employed as adjuvants for polymeric materials. Inasmuch as the present phosphates are substantially unreactive with the usual, commercially available polymer adjuvants, the use of such adjuvants with the phosphates is permissible and in many instances is desirable, e.g., fillers, dyes, crosslinking agents, foam-producing agents, fungicides, etc. may be used.

Polymeric materials containing the presently provided mixed phosphates may be molded, extruded, calendered, spread, or sprayed. Typical applications for the materials include molded, cast or extruded objects, continuous sheetings, tubing, fibers, films, wire coatings, textile coatings, laminates, paints, varnishes and enamels, wood preservatives, adhesives, and caulking compounds.

Other modes of applying the principles of this invention may be employed instead of those specifically set forth above, changes being made as regards the details herein disclosed, provided the elements set forth in any of the following claims or equivalents thereof be employed.

What we claim is:

1. 2-bromoethyl 2-bromopropyl 2-chloropropyl phosphate.
2. 3-bromo-2,2-dimethylpropyl 2-chloropropyl 2-bromopropyl phosphate.
3. 3-bromo-2,2-dimethylpropyl phosphorobromidochloridate.
4. 3-bromo-2,2-dimethylpropyl 2-bromo-3-butenyl 2-chloro-3-butenyl phosphate.
5. The method of preparing phosphates containing both chlorine and bromine which comprises treating with bromine a cyclic phosphorus compound of the formula

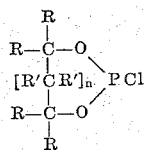

wherein R is selected from the class consisting of hydrogen and alkyl of from 1 to 2 carbon atoms and haloalkyl of from 1 to 2 carbon atoms, R' is selected from the class consisting of hydrogen and alkyl of from 1 to 5 carbon atoms and haloalkyl of from 1 to 5 carbon atoms, and $n$ is zero or one, until cessation of bromine discolorization, and then contacting the resulting reaction product with an oxirane compound of the formula

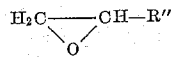

in which R″ is selected from the class consisting of hydrogen, alkyl of from 1 to 5 carbon atoms and haloalkyl of from 1 to 5 carbon atoms, vinyl, propenyl, propynyl, phenoxymethyl, and cyclohexyloxymethyl.

6. The method of preparing phosphorobromidochloridates which comprises treating with bromine a cyclic compound of phosphorus of the formula

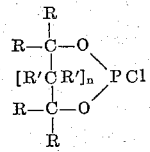

wherein R is selected from the class consisting of hydrogen and alkyl of from 1 to 2 carbon atoms and haloalkyl of from 1 to 2 carbon atoms, R' is selected from the class consisting of hydrogen and alkyl of from 1 to 5 carbon atoms and haloalkyl of from 1 to 5 carbon atoms, and $n$ is zero or one.

7. The method which comprises treating 2-chloro-1,3,2-dioxaphospholane with bromine until cessation of bromine decolorization and reacting the resulting reaction product with ethylene oxide to give bis(2-bromoethyl) 2-chloroethyl phosphate.

8. The method which comprises reacting 2-chloro-1,3,2-dioxaphospholane with bromine to give 2-bromoethyl phosphorobromidochloridate.

9. The method which comprises mixing together phosphorous trichloride with a diol of the formula

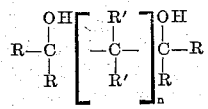

where R is selected from the class consisting of hydrogen and alkyl of from 1 to 2 carbon atoms and haloalkyl of from 1 to 2 carbon atoms, R' is selected from the class consisting of hydrogen and alkyl of from 1 to 5 carbon atoms and haloalkyl of from 1 to 5 carbon atoms, and $n$ is a number of zero to one, until cessation of hydrogen chloride evolution, treating the resulting reaction mixture with bromine until cessation of bromine decolorization, and reacting the resulting bromination product with an oxirane compound of the formula

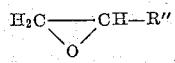

where R″ is selected from the class consisting of hydrogen, alkyl of from 1 to 5 carbon atoms and haloalkyl of from 1 to 5 carbon atoms and vinyl, propenyl, propynyl, phenoxymethyl, and cyclohexyloxymethyl to give a mixed phosphate of the formula

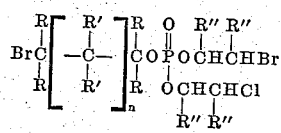

were R, R', R" and n are as defined above.

10. The method which comprises reacting 2-chloro-5,5-dimethyl-1,3,2-dioxaphosphorinane with bromine to give 3-bromo-2,2-dimethylpropyl phosphorobromidochloridate.

11. The method which comprises reacting 2-chloro-4-(chloromethyl)-1,3,2-dioxaphospholane with bromine to give 2-bromo-1-(chloromethyl)ethyl phosphorobromidochloridate and 2-bromo-3-chloropropyl phosphorobromidochloridate.

12. 2-bromo-1-(chloromethyl)ethyl 2-bromo-3-phenoxypropyl 2-chloro-3-phenoxypropyl phosphate together with minor amounts of isomeric phosphate esters.

References Cited in the file of this patent
UNITED STATES PATENTS

| | | |
|---|---|---|
| 1,936,985 | Lommel et al. | Nov. 28, 1933 |
| 1,955,207 | Stotter et al. | Apr. 17, 1934 |
| 2,504,120 | Gamrath | Apr. 18, 1950 |
| 2,510,908 | Schubert et al. | June 6, 1950 |
| 2,574,515 | Walter | Nov. 13, 1951 |
| 2,610,978 | Lanham | Sept. 16, 1952 |
| 2,744,128 | Morris et al. | May 1, 1956 |
| 3,010,988 | Raffelson et al. | Nov. 28, 1961 |

UNITED STATES PATENT OFFICE
CERTIFICATE OF CORRECTION

Patent No. 3,132,169  May 5, 1964

Gail H. Birum et al.

It is hereby certified that error appears in the above numbered patent requiring correction and that the said Letters Patent should read as corrected below.

Column 8, line 39, for "dimensoinal" read -- dimensional --; column 17, in the table, under the heading "Calc'd for $C_6H_{12}Br_2ClO_4P$", line 3 thereof, for "4.75" read -- 42.75 --; same column 17, line 49, for "$H_2PO_4$" read -- $H_3PO_4$ --; column 18, line 22, for "a tall" read -- at all --.

Signed and sealed this 8th day of December 1964.

(SEAL)
Attest:

ERNEST W. SWIDER
Attesting Officer

EDWARD J. BRENNER
Commissioner of Patents